US012415108B2

(12) United States Patent
Chattaway et al.

(10) Patent No.: US 12,415,108 B2
(45) Date of Patent: Sep. 16, 2025

(54) FIRE SUPPRESSION BLENDS OF CF3I, HCFOS AND CO2

(71) Applicant: Kidde Technologies, Inc., Wilson, NC (US)

(72) Inventors: Adam Chattaway, Old Windsor (GB); Terry Simpson, Wake Forest, NC (US); Harlan Hagge, Knightdale, NC (US); Mark P. Fazzio, Wilson, NC (US); Marios C. Soteriou, Middletown, CT (US); Paul Papas, West Hartford, CT (US); Eli Baldwin, Knightdale, NC (US); Qing Edda Liu, Wake Forest, NC (US)

(73) Assignee: Kidde Technologies, Inc., Wilson, NC (US)

( * ) Notice: Subject to any disclaimer, the term of this patent is extended or adjusted under 35 U.S.C. 154(b) by 457 days.

(21) Appl. No.: 17/798,751

(22) PCT Filed: Feb. 16, 2021

(86) PCT No.: PCT/US2021/018217
§ 371 (c)(1),
(2) Date: Aug. 10, 2022

(87) PCT Pub. No.: WO2021/230935
PCT Pub. Date: Nov. 18, 2021

(65) Prior Publication Data

US 2023/0066103 A1 Mar. 2, 2023

Related U.S. Application Data

(60) Provisional application No. 62/976,806, filed on Feb. 14, 2020.

(51) Int. Cl.
*A62D 1/00* (2006.01)

(52) U.S. Cl.
CPC ......... *A62D 1/0092* (2013.01); *A62D 1/0057* (2013.01)

(58) Field of Classification Search
None
See application file for complete search history.

(56) References Cited

U.S. PATENT DOCUMENTS

| | | | |
|---|---|---|---|
| 5,759,430 | A | 6/1998 | Tapscott et al. |
| 7,153,446 | B2 | 12/2006 | Grigg |
| 7,223,351 | B2 | 5/2007 | Sharma et al. |
| 7,597,818 | B2 | 10/2009 | Singh et al. |
| 8,492,327 | B2 | 7/2013 | Singh et al. |

(Continued)

FOREIGN PATENT DOCUMENTS

| | | | |
|---|---|---|---|
| CN | 103341243 | A | 10/2013 |
| EP | 2287271 | A2 | 2/2011 |

(Continued)

OTHER PUBLICATIONS

CN 10800419 A (Year: 2018).*

(Continued)

*Primary Examiner* — Joseph D Anthony
(74) *Attorney, Agent, or Firm* — Kinney & Lange, P.A.

(57) ABSTRACT

A fire suppressant blend comprises CF3I; at least one hydrofluoro-olefin (HFO) or hydrochlorofluoro-olefin (HCFO), or both; and carbon dioxide.

11 Claims, 3 Drawing Sheets

(56) References Cited

U.S. PATENT DOCUMENTS

| | | | | |
|---|---|---|---|---|
| 9,309,450 | B2 | 4/2016 | Low | |
| 9,540,556 | B2 | 1/2017 | Minor et al. | |
| 9,713,732 | B2 | 7/2017 | Mitchell et al. | |
| 9,884,946 | B2 | 2/2018 | Singh et al. | |
| 9,920,230 | B2 | 3/2018 | Thomas et al. | |
| 9,994,750 | B2 | 6/2018 | Singh et al. | |
| 10,301,521 | B2 | 5/2019 | Sethi et al. | |
| 10,335,623 | B2 | 7/2019 | Kennoy et al. | |
| 10,343,003 | B2 | 7/2019 | Baker et al. | |
| 10,344,136 | B2 | 7/2019 | Bogdan et al. | |
| 10,479,747 | B2 | 11/2019 | Gregersen et al. | |
| 2006/0243944 | A1* | 11/2006 | Minor | C09K 5/045 252/67 |
| 2008/0157022 | A1* | 7/2008 | Singh | C09K 5/045 252/68 |
| 2010/0032610 | A1 | 2/2010 | Nappa et al. | |
| 2010/0171062 | A1* | 7/2010 | Luly | A62C 99/0018 252/571 |
| 2015/0041157 | A1 | 2/2015 | Mitchell et al. | |
| 2017/0028240 | A1 | 2/2017 | Robin | |
| 2018/0016212 | A1* | 1/2018 | Singh | C07C 21/18 |
| 2018/0043199 | A1 | 2/2018 | Robin | |
| 2018/0079941 | A1* | 3/2018 | Ueno | C09K 5/044 |
| 2018/0264303 | A1 | 9/2018 | Robin et al. | |
| 2018/0318623 | A1* | 11/2018 | Richard | A62D 1/0057 |
| 2019/0161660 | A1* | 5/2019 | Yana Motta | C09K 5/045 |
| 2019/0249055 | A1 | 8/2019 | Sethi et al. | |
| 2019/0290946 | A1 | 9/2019 | Ribarov et al. | |
| 2019/0290950 | A1 | 9/2019 | Hagge et al. | |
| 2019/0290951 | A1 | 9/2019 | Hagge et al. | |

FOREIGN PATENT DOCUMENTS

| | | | |
|---|---|---|---|
| EP | 3546030 | A1 | 10/2019 |
| JP | 2018153463 | A | 10/2018 |
| WO | 2007144623 | A1 | 12/2007 |
| WO | 2014007862 | A2 | 1/2014 |
| WO | 2015048604 | A1 | 4/2015 |
| WO | 2018208832 | A1 | 11/2018 |
| WO | 2019036049 | A1 | 2/2019 |
| WO | 2019099961 | A1 | 5/2019 |
| WO | 2019220463 | A1 | 11/2019 |

OTHER PUBLICATIONS

CN 104293301 A (Year: 2015).*

Extended European Search Report for European Patent Application No. 21805041.7, dated Feb. 22, 2024, 8 pages.

International Preliminary Report on Patentability for PCT Application No. PCT/US2021/018212, dated Aug. 25, 2022, 9 pages.

International Preliminary Report on Patentability for PCT Application No. PCT/US2021/018217, dated Aug. 25, 2022, 7 pages.

International Search Report and Written Opinion for PCT Application No. PCT/US21/18212, dated Nov. 23, 2021, 10 pages.

International Search Report and Written Opinion for PCT Application No. PCT/US21/18217, dated Nov. 4, 2021, 8 pages.

* cited by examiner

| Prop. (Vol%) | CF3I (Vol%) | 1224yd (Vol%) | CO2 (Vol%) | Mol Ratio | Pressure rise (psi) | Comment |
|---|---|---|---|---|---|---|
| 2.48 | | | | | 56.74 | Unsuppressed baseline |
| 2.48 | | 2.02 | | | 100.32 | HCFO1224yd itself will enhance explosion |
| 2.55 | 0.99 | 0.97 | 2.09 | 1:1:2 | 55.69 | No higher pressure rise than baseline tests |
| 2.52 | 0.97 | 1.01 | 3 | 1:1:3 | 0.94 | Less pressure rise than baseline tests |
| 2.63 | 1.42 | 0.65 | 2.14 | 2:1:3 | 0.51 | Less pressure rise than baseline tests |
| 2.56 | 1.01 | 1 | 3.94 | 1:1:4 | 0.91 | Less pressure rise than baseline tests |

FIG. 2

| Prop. (Vol%) | CF3I (Vol%) | 1224yd (Vol%) | CO2 (Vol%) | Mol Ratio | FIC | Rel. wt to 6% Halon 1301 | Rel. vol to 6% Halon 1301 |
|---|---|---|---|---|---|---|---|
| 4.01 | 3.19 | 1.63 | 4.8 | 2:1:3 | 0.85 | 1.21 | 1.32 |
| 3.97 | 2.31 | 2.31 | 6.9 | 1:1:3 | 0.86 | 1.23 | 1.53 |
| 4.04 | 3.74 | 2 | 2.01 | 2:1:1 | 0.87 | 1.25 | 1.19 |
| 4.03 | 4.21 | 1.38 | 1.39 | 3:1:1 | 0.85 | 1.22 | 1.08 |

FIG 3

FIRE SUPPRESSION BLENDS OF CF3I, HCFOS AND CO2

BACKGROUND

Fire protection is required in several areas of the aircraft, including the cargo compartment and the engine/auxiliary power unit (APU). Currently these two systems use the same agent (Halon 1301) but are separate. This adds weight to the overall system as separate containers for the agent are required. Furthermore, the cargo compartment comprises two distinct phases: an initial high-rate discharge (HRD) to knock the fire down, followed by a subsequent low-rate discharge (LRD) to keep the fire suppressed or contained until the aircraft can land safely. The agent, Halon 1301, is an ozone depleting substance (ODS) and is being phased out. Production ceased in 1994 in the developed world and in 2010 in developing countries. In addition, the aviation industry is facing "cut-off" dates (i.e. do not use Halon 1301 after this date) and "end dates" (Halon 1301 must no longer be used and must be replaced with an alternative agent, including retrofit, after this date). The aviation fire protection community has been searching for a replacement for Halon 1301 for the last 20 years, without success.

A number of options to replace Halon 1301 in cargo compartments have been suggested, including hydrofluorocarbons (HFCs), and 2-bromo-trifluoropropene (2-BTP). None of these is ideal for the following reasons.

HFC's and 2-BTP fail a key performance test (a simulated exploding aerosol canister) in that, if tested at a concentration below the inerting concentration, they can in some circumstances make the explosion worse than if no agent was employed at all. Inert gas and water mist pass this test but are inefficient fire extinguishing agents and the resulting size and weight of the fire protection system has been deemed to be unacceptable by aircraft original equipment manufacturers (OEMs).

A number of replacements for HFCs in the refrigerant industry, based on hydrofluoro-olefins (i.e. contain carbon, (chlorine) fluorine and hydrogen and a carbon-carbon double bond (denoted C═C)), have been proposed as they offer similar physical properties to the HFC. However, due to reactivity of the C═C bond, they have much shorter atmospheric lifetimes. HCFOs have also been tested against the simulated exploding aerosol canister, and they also exacerbate the explosion if tested at a concentration below the inerting concentration.

A promising Halon replacement agent, trifluoroidomethane or CF3I, does not fail the aerosol can test. However, when tested recently, it failed another test, the bulk load fire test. In this test the fire load is cardboard boxes filled with shredded paper, which gives rise to deep-seated fire that is difficult to extinguish. CF3I is less thermally stable than Halon 1301, and the agent decomposed in the "preheat zone", i.e. en route to the fire.

SUMMARY

A fire suppressant blend comprises CF3I, at least one hydrofluoro-olefin (HFO) or hydrochlorofluoro-olefin (HCFO), and carbon dioxide.

BRIEF DESCRIPTION OF THE DRAWINGS

FIG. 2 is a chart showing results of sub-inerting tests for CF3I:HCFO:CO2 blends.

FIG. 3 is a chart showing results of peak inerting tests for CF3I:HCFO:CO2 blends.

DETAILED DESCRIPTION

Figure 1:
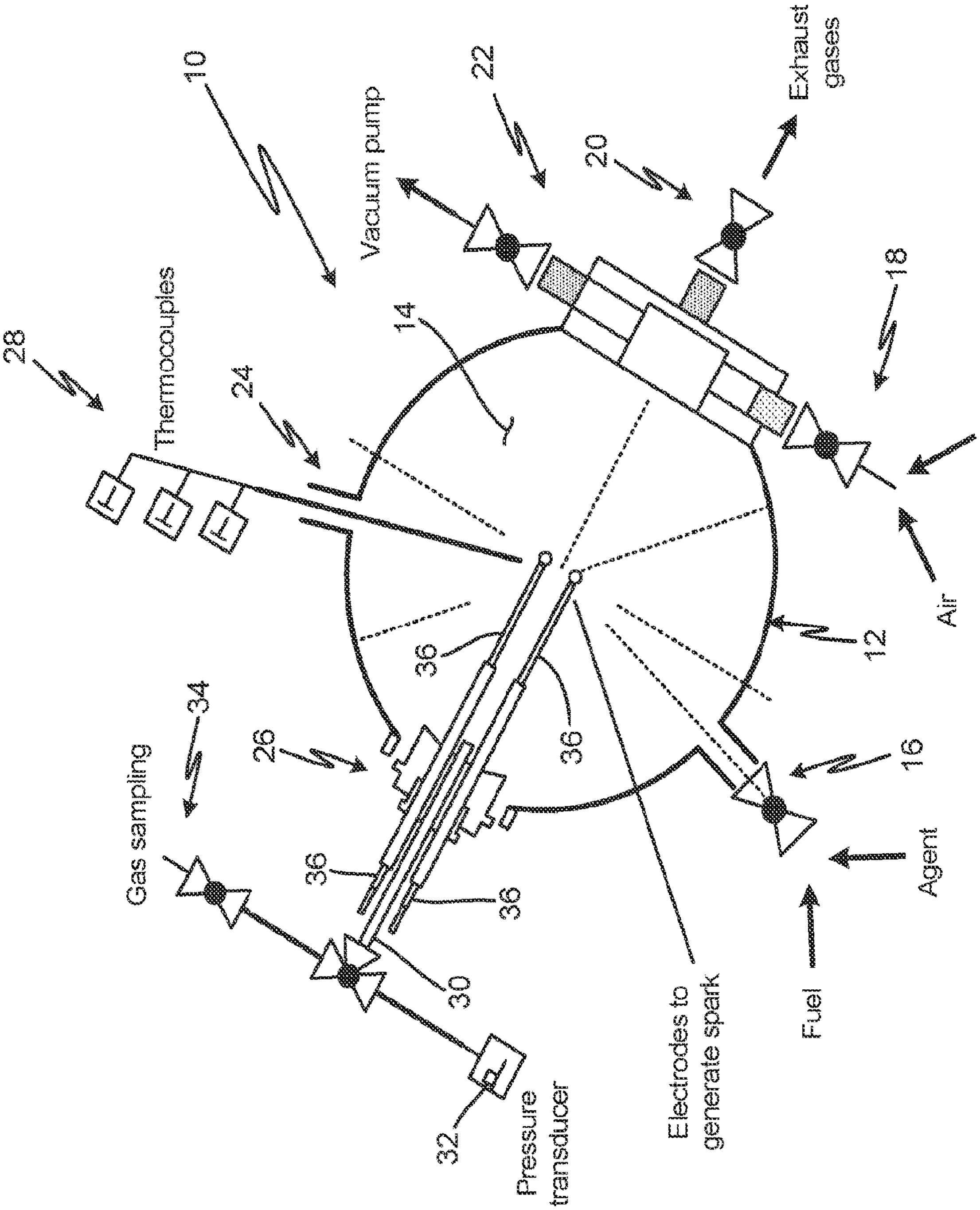
FIG. 1 is a diagram showing an inerting test sphere.

CF3I is an efficient fire suppression agent, so it serves as the primary basis of the fire suppression blend. Cooling agents are added to the blend to lower the temperature of the cargo compartment and prevent excessive decomposition of the CF3I. A mixture of one of more HCFOs/HFOs with and carbon dioxide is used as the cooling agent in the blend with CF3I.

Example HCFOs Include:

- HCFO-1233zdE (trans 1-chloro-3,3,3-trifluoropropene CHCl═C(H)CF3.
- HCFO-1224ydE (trans 1-chloro-2,3,3,3-tetrafluoropropene CHCl═C(F)CF3.

Example HFOs Include:

- HFO-1234zeE (trans 1,3,3,3-Tetrafluoropropene, CHF═C(H)CF3).
- HFC1234yf (2,3,3,3-Tetrafluoropropene, CH2=C(F) CF3).
- The CF3I quantity may range from 20 mol % to 80 mol %.
- The HCFO/HFO agent quantity may range from 1 mol % to 50 mol %.
- The CO2 quantity may range from 20 mol % to 80 mol %.
- Adding more CO2 increases the cooling, but requires more volume to store.
- Adding more of the HCFO/HFO agent improves the toxicity of the blend and also reduces its cost.

Description of Inerting Test

To determine the effectiveness of CF3I:HCFO/HFO:CO2 fire suppressant blends, CF3I:HCFO:CO2 fire suppressant blends, or CF3I:HFO:CO2 fire suppression blends, two categories of inerting tests were performed: sub-inerting tests and peak inerting tests. Testing was performed against propane-air explosions in 42 liter spherical test vessel 10.

FIG. 1 shows an illustration of spherical test vessel 10, which includes spherical housing 12, interior chamber 14, ports 16, 18, 20, 22, 24, and 26, thermocouples 28, gas probe 30, pressure transducer 32, gas sampler 34, and electrodes 36. Fuel (propane) and fire suppression agents to be tested are introduced into interior chamber 14 of housing 12 through port 16. Air and nitrogen are introduced into the interior of housing through port 18. Exhaust gases generated during a test can be removed through port 20. At the beginning of a test procedure, interior chamber 14 is evacuated through part 22 using a vacuum pump. Thermocouples 28 extend through port 24 to sense temperature within interior vessel 14 during testing. Port 26 provides access to interior chamber for probe 30 and electrodes. Pressure transducer 32 is connected to probe 30 and monitors gas pressure within interior vessel 14 before and during the test. Gas sampler 34 is also is connected to probe 30, and allows sampling of gas within the interior chamber 14 during the test procedure. Electrodes pass through port 26 and extend to the center of interior chamber 14. Electrodes are used to produce a spark to ignite the fuel and initiate the test.

Previous work has defined the stoichiometric (theoretically most explosive) propane-air mixture as 4% propane in air. Therefore, this concentration is used to assess the relative performance of extinguishing agents and blends thereof.

A first step in the procedure for a peak inerting test is to evacuate the sphere. Then, while monitoring pressure transducer 32, propane is added to a pressure of 0.04 atm (i.e. 4% in the final mix), and then the agent or agents are added at the desired concentration. For example, if a blend of 3.2% CF3I, 1.6% HCFO1224yd and 4.8% CO2 were to be the subject of the peak inerting test, CF3I is added until the pressure reaches 0.072 atm (4% propane+3.2% CF3I). Then, HCFO1224yd is added until the pressure reaches 0.088 atm (4% propane+3.2% CF3I+1.6% HCFO1224yd), and CO2 is added until the pressure reaches 0.136 atm (4% propane+3.2% CF3I+1.6% HCFO1224yd+4.8% CO2). Finally, air is added to raise the pressure in the sphere to 1.00 atm. Long enough equilibration time or fan mixing is used to ensure that all the gases are mixed homogeneously throughout interior chamber 14 before the test is initiated. At test, the spark is ignited, and the pressure rise monitored by a data logger. A pressure rise of 1 psi or lower is designated as a pass.

Sub-inerting testing uses 2.5% propane in air, and 0.3-0.5 fractional peak inerting concentration of agent, to predict if the agent/blend would enhance explosion in aerosol can test. Sub-inerting tests use the same procedure as the peak inerting tests, except 2.5% propane is used in the final mix. A pressure rise that is less than the baseline test pressure rise predicts that the agent (blend) will not generate explosion in aerosol can test, and therefore passes of aerosol can test.

Discussions on Synergy

When assessing blends, the concept of Fractional Inerting Contribution (FIC) is helpful. This is defined as $$FIC = \sum_{i=1}^{n} \frac{C_i}{IC_i}$$

where Ci is the Concentration of component i, and ICi is the Inerting Concentration of component i.

It has been demonstrated that successful inerting should be attained when FIC is close to 1 (i.e., 0.95+), where effectiveness of the blend is equal to the summation of effectiveness of each component. When a successful inerting test has an FIC less than 1 (0.9 or less), the effectiveness of the blend is higher than the summation of effectiveness of each component. That indicates that a synergy of the components of the blend has a positive effect on suppression efficiency.

CF3I:HCFO1224yd:CO2 Sub-Inerting Tests

CF3I serves as the primary component of the fire suppression blend. Cooling agents (HCFO/HFO and CO2) are added to the blend to lower the temperature of the cargo compartment to prevent excessive decomposition of the CF3I. CO2 is an efficient physical cooling agent, but has drawbacks of low molar efficiency and suppressor volume penalty. The purpose of the HCFO/HFO agent(s) is to provide extra cooling beyond CO2, and reduce volume penalty brought up from CO2. A minimum level of CF3I and CO2 is required to ensure that HCFO/HFO component in the blend does not enhance explosion in sub-inerting tests, and thus cause an aerosol can explosion.

HCFO1224yd is an example HCFO used in the tests. In the sub-inerting test data shown in FIG. 2, first data row is the unsuppressed baseline test; sub-inerting tests with pressure rise no higher than its pressure rise (56.74 psi) will not enhance explosion at low fuel concentration, thus should be able to pass aerosol can tests. The second data row is HCFO1224yd sub-inerting test result; 100.32 psi pressure rise is higher than that of unsuppressed baseline test, which means HCFO1224yd as the only agent would enhance explosion at low fuel concentration. Starting from the third data row, it shows some examples that CF3I:HCFO1224yd:CO2 with these molar ratios could stabilize the HCFO1224yd against the exploding aerosol can threat (pressure rise of blends are all no higher than 56.74 psi). Sufficient CF3I and CO2 will ensure the agent blend does not enhance sub-inerting explosion.

CF3I:HCFO1224yd:CO2 Successful Peak-Inerting Test

FIG. 3 is a table showing successful peak-inerting test of some CF3I/1224yd/CO2 blends. These blends would pass sub-inerting tests and does not enhance aerosol can explosion. FIC lower than 0.9 indicates a positive synergy of the blend on suppression efficiency. The example blends could pass inerting test with about 1.2 relative weight to 6% Halon 1301; relative volume of 3:1:1 CF3I/1224yd/CO2 blend to 6% Halon 1301 could be as low as 1.1.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fire suppressant blend comprising:

CF3I;

at least one hydrochlorofluoro-olefin (HCFO); and carbon dioxide, and wherein the mol ratio of CO2 to (HCFO) is from 1:1 to 3:1, and wherein said blend can optionally further comprise at least one hydrofluoro-olefin (HFO).

2. The fire suppressant blend of claim 1 wherein CF3I quantity in the fire suppressant blend is in a range from 20 mol % to 80 mol %.

3. The fire suppressant blend of claim 2 wherein HCFO/HFO quantity in the fire suppressant blend is in a range from 1 mol % to 50 mol %.

4. The fire suppressant blend of claim 3 wherein CO2 quantity in the fire suppressant blend is in a range from 20 mol % to 80 mol %.

5. The fire suppressant blend of claim 1 wherein HCFO/HFO quantity in the fire suppressant blend is in a range from 1 mol % to 50 mol %.

6. The fire suppressant blend of claim 5 wherein CO2 quantity in the fire suppressant blend is in a range from 20 mol % to 80 mol %.

7. The fire suppressant blend of claim 1 wherein CO2 quantity in the fire suppressant blend is in a range from 20 mol % to 80 mol %.

8. The fire suppressant blend of claim 1 wherein at least one hydrochlorofluoro-olefin (HCFO) is from the group consisting of:

HCFO-1233zdE (trans 1-chloro-3,3,3-trifluoropropene CHCl═C(H)CF3; and

HCFO-1224ydE (trans1-chloro-2,3,3,3-tetrafluoropropene CHCl═C(F)CF3.

9. The fire suppressant blend of claim 1 wherein at least one hydrofluoro-olefin (HFO) is from the group consisting of:

HFO-1234zeE (trans 1,3,3,3-Tetrafluoropropene, CHF═C(H)CF3); and

HFO-1234yf (2,3,3,3-Tetrafluoropropene, $CH_2=C(F)CF_3$).

10. The fire suppression blend of claim 1, wherein a mol ratio of $CF_3I$ to HCFO is from 1:1 to 3:1.

11. The fire suppression blend of claim 1, wherein a mol ratio of $CF_3I$ to $CO_2$ is from 1:4 to 3:1.

* * * * *